United States Patent [19]
Choi

[11] Patent Number: 5,544,853
[45] Date of Patent: Aug. 13, 1996

[54] DAMPER DEVICE

[75] Inventor: Jeong M. Choi, Kyungki-Do, Rep. of Korea

[73] Assignee: Golstar Co., Ltd., Rep. of Korea

[21] Appl. No.: 230,241

[22] Filed: Apr. 20, 1994

[30] Foreign Application Priority Data

Apr. 24, 1993 [KR] Rep. of Korea ............... 6936/1993

[51] Int. Cl.$^6$ ................................................. F16K 31/08
[52] U.S. Cl. ................................. 251/65; 251/129.01
[58] Field of Search ........................... 251/65, 129.01, 251/129.02, 129.15, 129.22, 129.03, 326, 129.2

[56] References Cited

U.S. PATENT DOCUMENTS

| | | | |
|---|---|---|---|
| 3,203,628 | 8/1965 | Schoch | 251/129.22 X |
| 4,559,971 | 12/1985 | Bradshaw | 251/65 X |
| 4,681,298 | 7/1987 | Bodine et al. | 251/129.15 X |
| 4,690,371 | 9/1987 | Bosley et al. | 251/65 |

FOREIGN PATENT DOCUMENTS 1255796  9/1986  U.S.S.R. ..................... 251/129.01

*Primary Examiner*—Martin P. Schwadron
*Assistant Examiner*—Kevin L. Lee

[57] ABSTRACT

The present invention relates to a damper device adapted for controlling the flow of cooled air in freezing machines, refrigerators and air conditioners. The damper device according to one preferred embodiment includes a damper casing having a damper opening of a predetermined size, an opening/closing member slidable in the damper casing for opening/closing the damper opening, a guide mechanism provided at both sides of the opening/closing member, an electromagnet fixed at an end of the opening/closing member having coils therearound, a permanent magnet fixed to one side of the damper casing, and a plurality of elastic members along the inner wall of the damper casing for elastically supporting the opening/closing member.

18 Claims, 8 Drawing Sheets

1
DAMPER DEVICE

BACKGROUND OF THE INVENTION

1. Field of the Invention

The present invention relates in general to a damper device which is used for freezers, refrigerators and air conditioners for controlling the amount of cooled air therein.

2. Description of the Prior Art

Conventionally, freezers, refrigerators and air conditioners have a damper device for controlling the flow of cooled air discharged from a cooled air discharging portion. A conventional damper device includes a drive motor for generating a driving force, a gear train which consists of a plurality of gears for transferring the force, a rigid bar operable by the gear train having a predetermined elasticity, and an opening/closing plate called the 'flap', for opening/closing a damper opening by the rigid bar which is responsive to force from the gear train.

However, the above-mentioned conventional damper device has certain disadvantages associated with its complicated construction due to the use of the drive motor and the gear train for opening/closing the damper opening, thereby decreasing the device's productivity and workability, and thus increasing the manufacturing cost. In addition, since there is no mechanism for properly controlling the opening/closing plate, there also exists a problem in being unable to control the amount of cooled air which is discharged from the damper opening.

SUMMARY OF THE INVENTION

Accordingly, it is an object of the invention to provide a damper device capable of precisely controlling the flow of cooled air through an apparatus by effectively controlling an opening/closing member.

To achieve the principal object of the present invention, the damper device includes a damper casing having a damper opening provided at one side of a bottom portion thereof; an opening/closing member movable in the damper casing for opening/closing the damper opening; means provided at both sides of the opening/closing member for moving the opening/closing member; an electromagnet provided fixedly at one end of the opening/closing member, having coils wound therearound; a permanent magnet provided fixedly at one side of right hand inner wall of the damper casing; and a plurality of elastic members for elastically supporting the opening/closing member, provided fixedly at one side of a left hand inner wall of the damper casing.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

2

Figure 1:
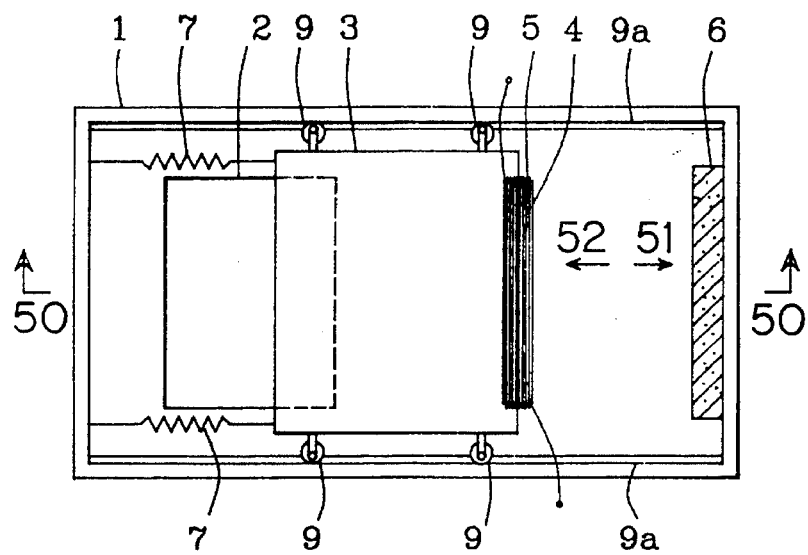
Figure 2A:
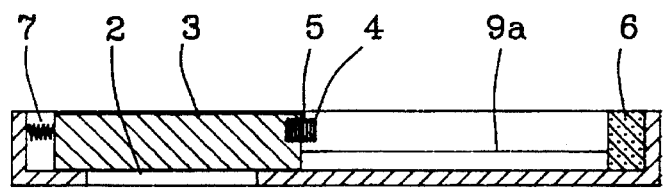
Figure 2B:
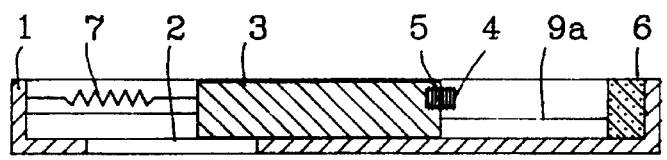
Figure 2C:
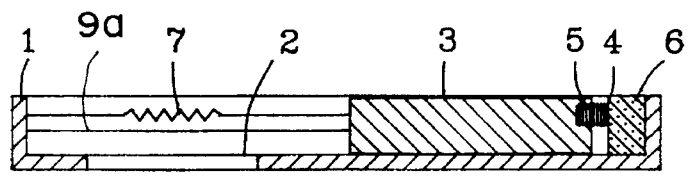
Figure 3:
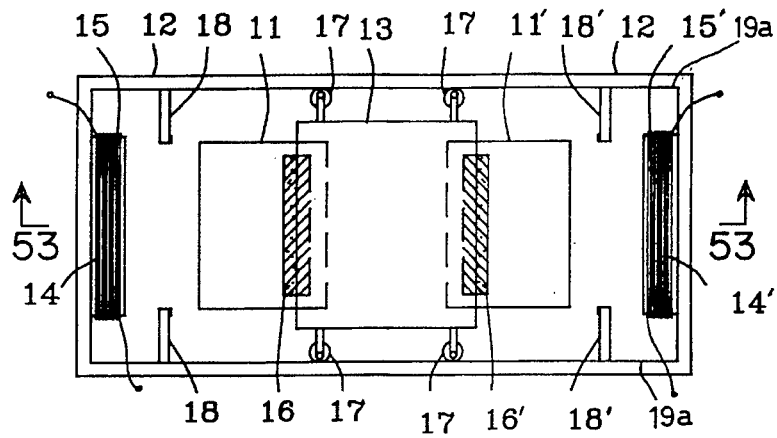
Figure 4A:
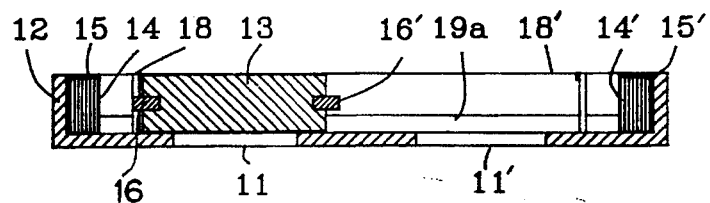
Figure 4B:
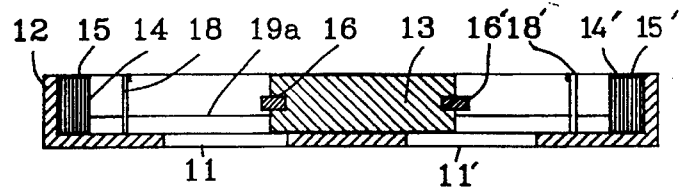
Figure 4C:
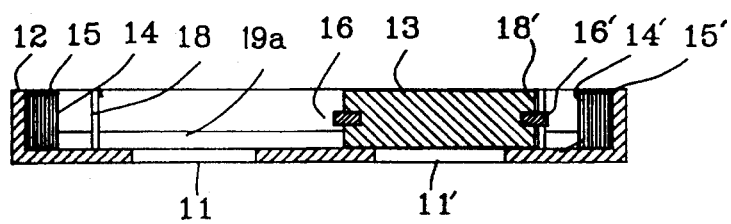
Figure 5:
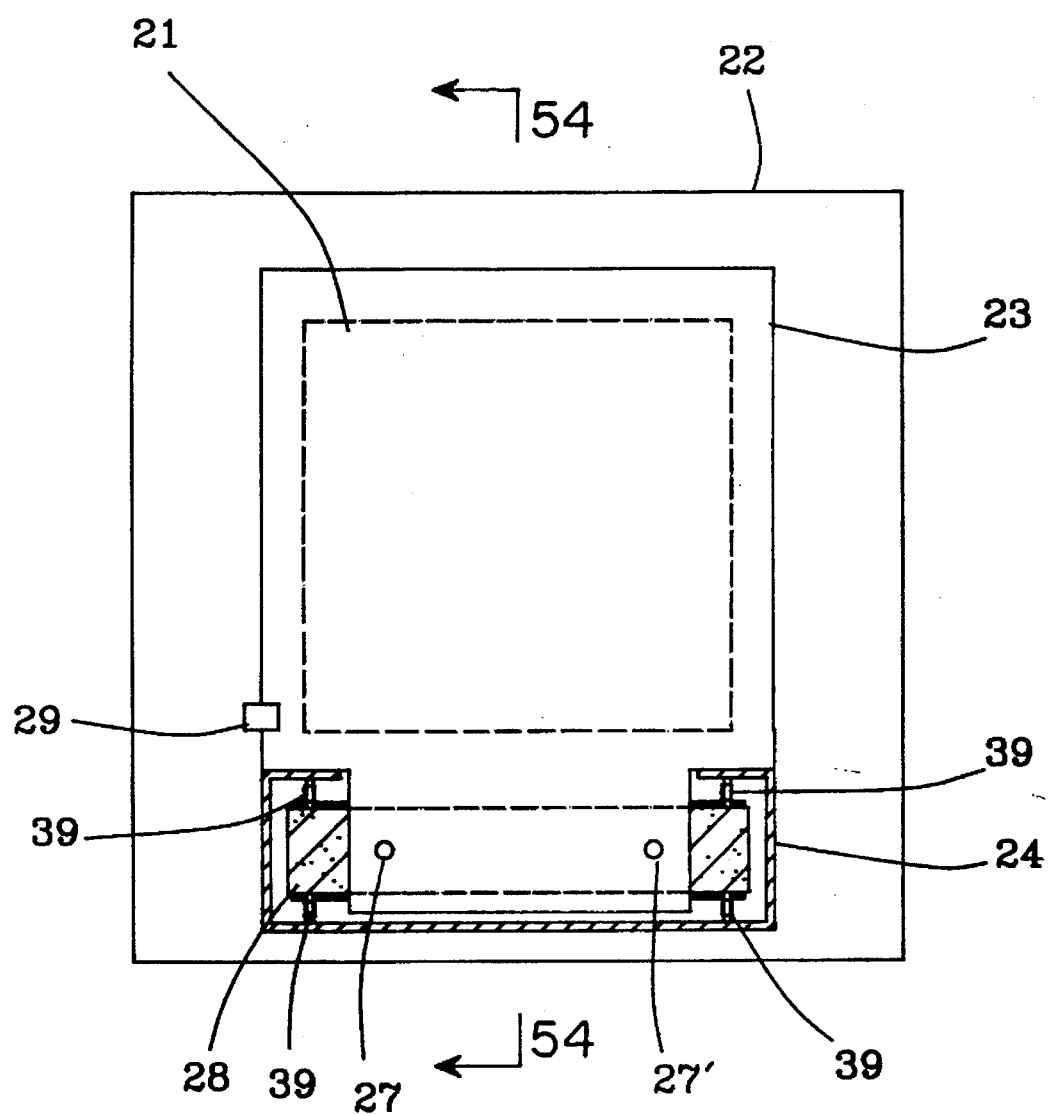
Figure 6A:
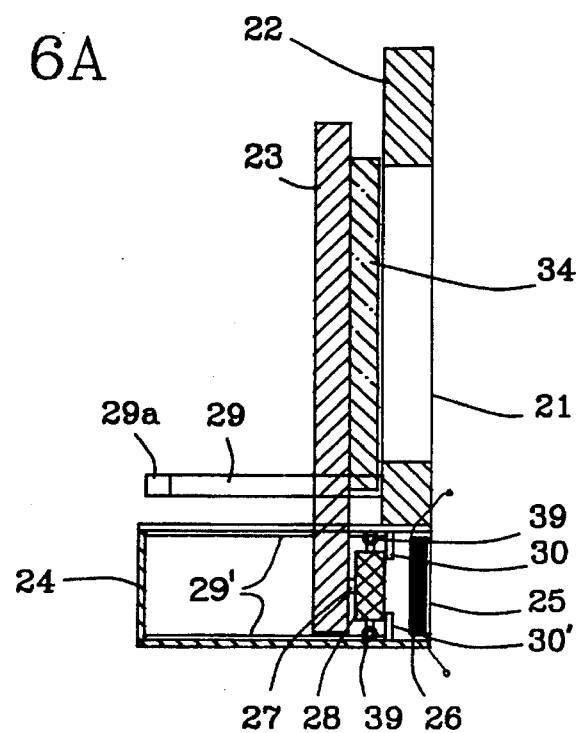
Figure 6B:
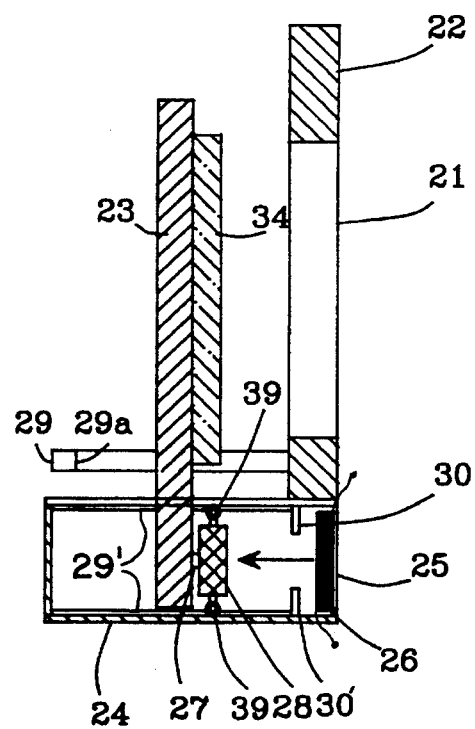
Figure 6C:
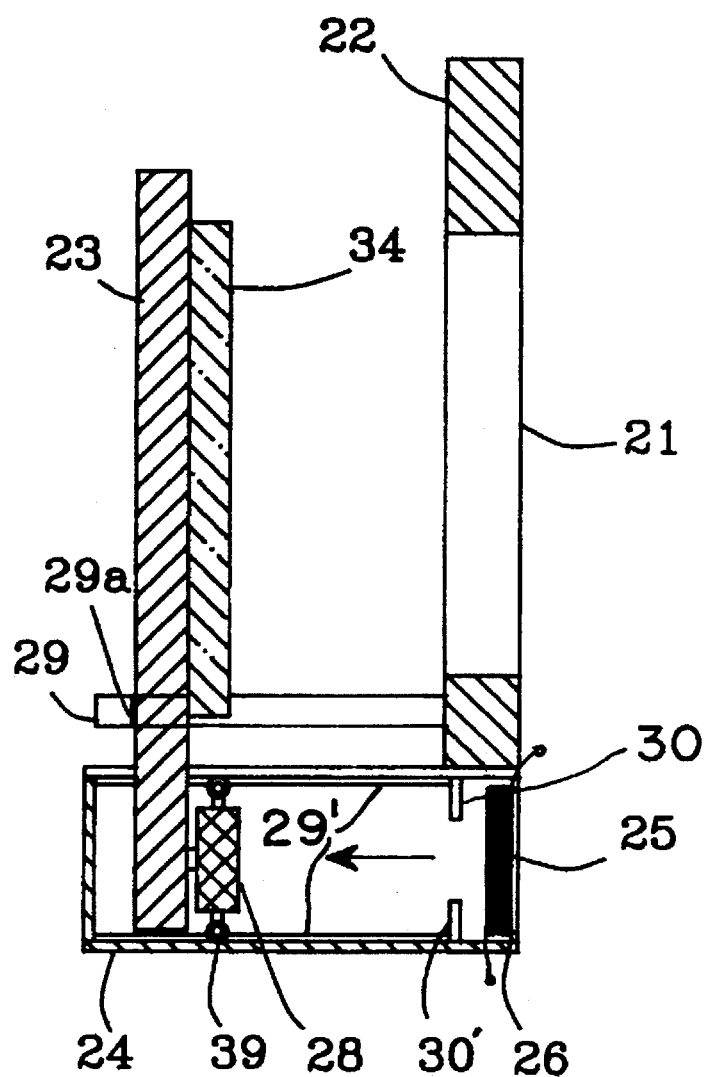
Figure 7:
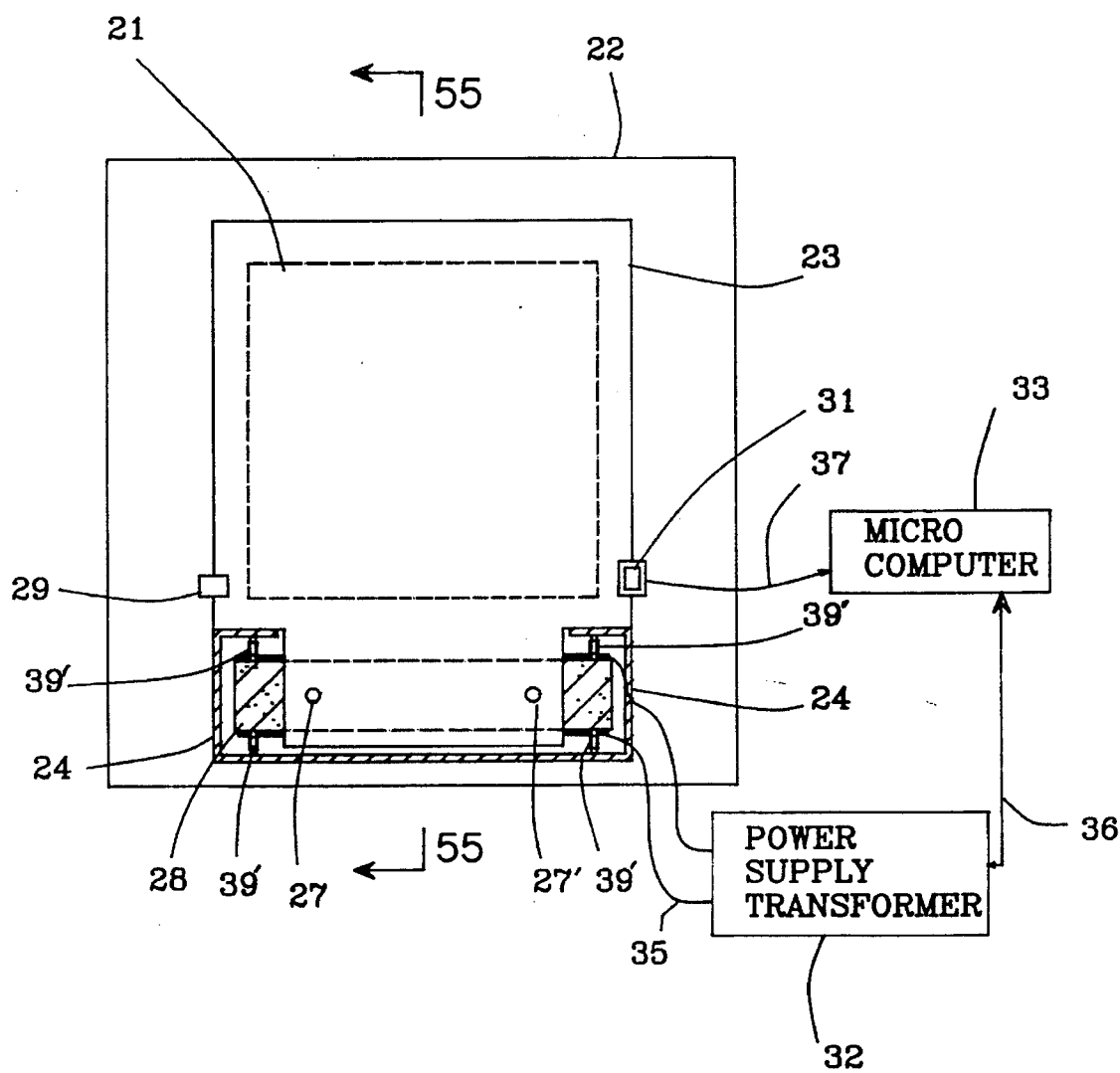
Figure 8A:
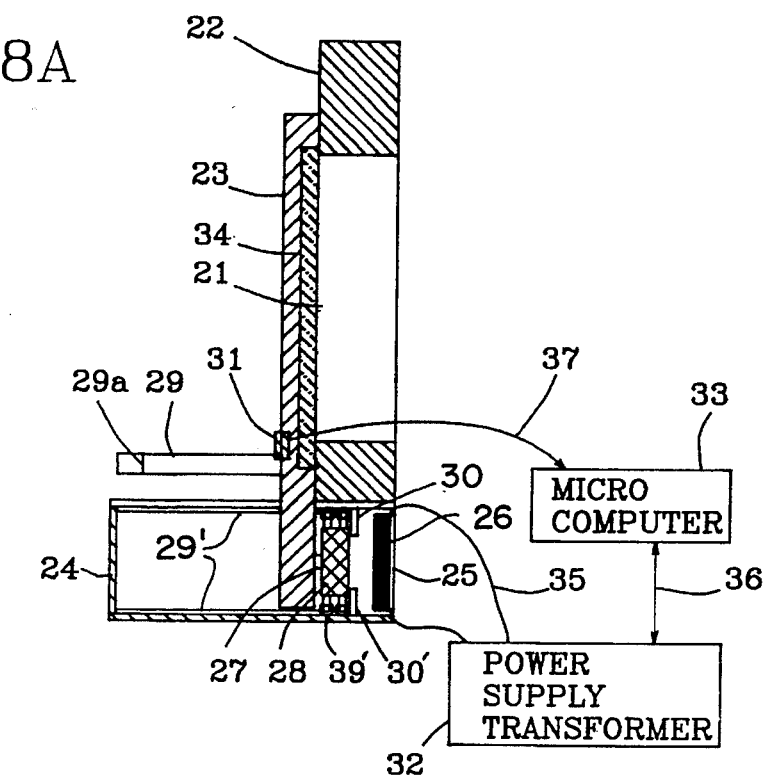
Figure 8B:
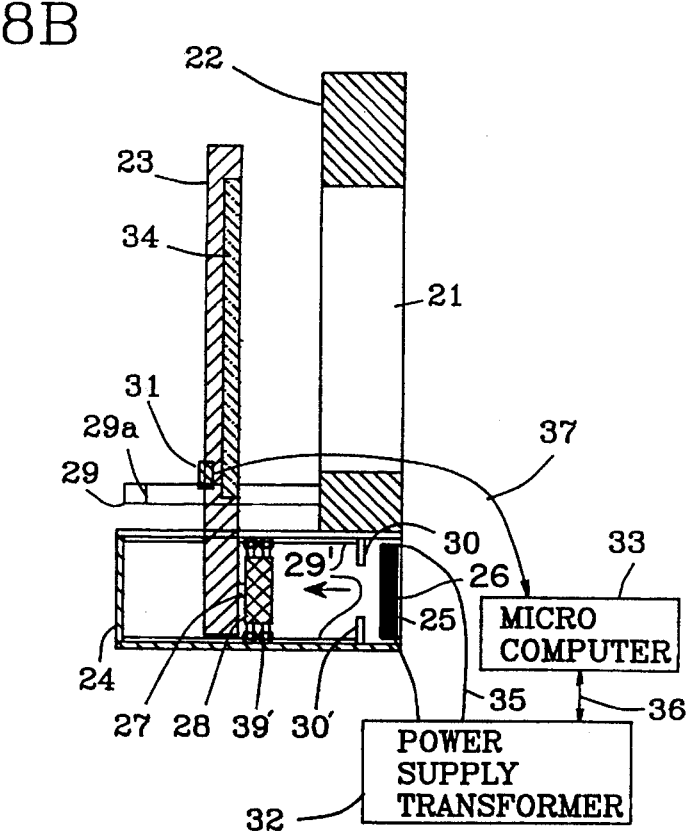
Figure 8C:
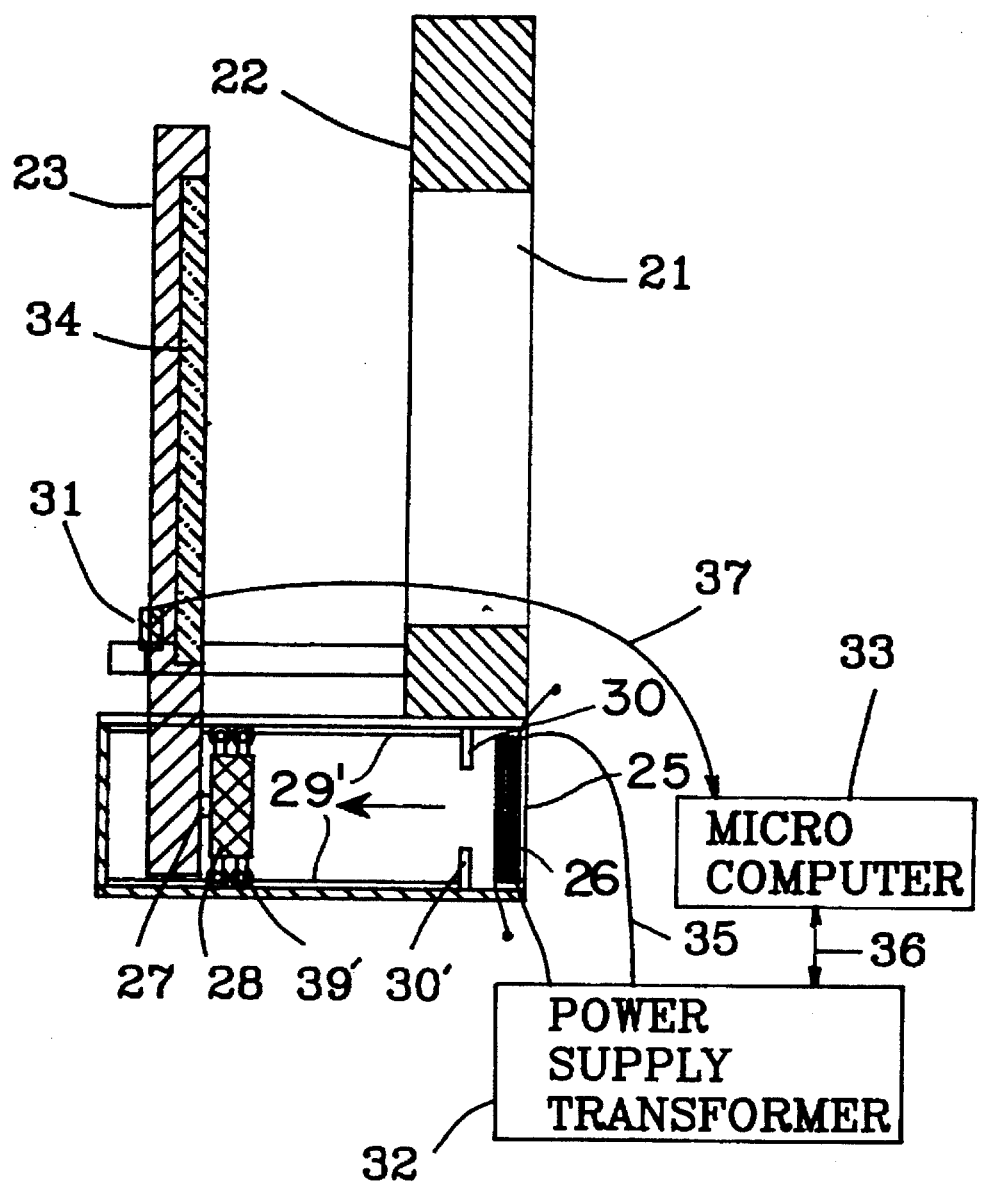

FIG. 1 is a front view showing a first embodiment of a damper device according to the present invention;

FIGS. 2A to 2C are sectional views showing the operation of a first embodiment of the damper device according to the present invention, taken on line 50 of FIG. 1;

FIG. 3 is a front view showing a second embodiment of a damper device according to the present invention;

FIGS. 4A to 4C are sectional views showing the operation of the second embodiment of the damper device according to the present invention, taken on line 53 of FIG. 3;

FIG. 5 is a front view showing a third embodiment of a damper device according to the present invention;

FIGS. 6A to 6C are sectional views showing the operation of the third embodiment of the damper device according to the present invention, taken on line 54 of FIG. 5;

FIG. 7 is a front view showing a fourth embodiment of a damper device according to the present invention; and FIGS. 8A to 8C are sectional views showing an operational relation of the fourth embodiment of the damper device according to the present invention.

DETAILED DESCRIPTION OF THE PREFERRED EMBODIMENTS

Referring to FIG. 1 showing a first embodiment of a damper device and FIGS. 2A to 2C showing the operation of the first embodiment according to the present invention, the damper device includes a damper casing 1 with a damper opening 2 which is provided in a bottom surface thereof, an opening/closing member 3 which is a type of plate, supported on a plurality of guide rails 9a which are respectively provided along a predetermined portion of both sides of the damper casing 1, a plurality of rollers 9 respectively provided along both sides of and connected to the opening/closing member 3 thereby enabling the rollers 9 connected to the opening/closing member 3 to slide along the guide rails 9a in the directions represented by arrows 52 and 51 of FIG. 1.

At an end of the opening/closing member 3, an electromagnet 4 is fixedly provided thereon. A coil 5 is wound around the electromagnet 4.

A permanent magnet 6 is fixedly provided at one side of an inner wall of the damper casing 1 and a plurality of elastic members 7 are provided at one side of an inner wall (opposite the wall on which the permanent magnet is mounted) of the damper casing 1 for elastically supporting the opening/closing member 3. The respective positions of electromagnet 4 and the permanent magnet 6 may be interchanged.

The permanent magnet 6 has an exclusive pole (either a N pole of S pole) at one side thereof, however the electromagnet 4 can have a pole alternatively between a N pole and S pole as determined by the direction of the current flow applied to the coil 5 thereof.

One end of each of the elastic members 7 is connected to an inner surface of the damper casing 1 with the opposite end thereof being connected to one side of the opening/closing member 3. It is preferred to use a tensile spring for securing the opening/closing member 3. However, the elastic members 7 are not restricted to be tensile springs. Any device that elastically supports the opening/closing member 3 such as a compression spring or other similar device may be used. When using the compression spring as the elastic members 7, the direction of the installation thereof will be opposite from that of the tensile spring.

The operation of the damper device of the first embodiment according to the present invention will be provided hereinunder.

Referring to FIG. 2A, the damper opening 2 of the damper case 1 is closed, for example, if the permanent magnet 6 has a N pole and the electromagnet 4 has a N pole by applying an electric power to the coil 5 thereof.

The repelling forces between the electromagnet 4 and the permanent magnet 6 cause the opening/closing member 3 to move in the 52 direction (indicated as an arrow) as shown in FIG. 1, thereby closing the damper opening 1. The opening/closing member 3 moves as far as the range of the repelling forces between the electromagnet 4 and the permanent magnet 6.

Meanwhile, if the direction of the current flow which is applied to the coil 5 is changed so that the electromagnet 4 has a S pole, a drawing force is created between the electromagnet 4 and the permanent magnet 6, whereby the opening/closing member 3 moves in the 51 direction (indicated by an arrow), and thus the damper opening 2 is opened.

In opening/closing the damper opening 2 by movement of the opening/closing member 3, if the power (or voltage) which is applied to the coil 5 is lowered, the opening/closing member 3 moves a corresponding shorter distance. If the power level is raised, the opening/closing member 3 moves a corresponding longer distance. So, it is possible to control the size of the damper opening 2 for controlling the amount of cooled air discharged from the damper opening 2 by controlling the applied voltage.

In addition, since the opening/closing member 3 is elastically engaged by the elastic members 7 and supported by the plurality of rollers 9, the movement thereof is smooth.

Referring to FIG. 3 which shows the front view of the damper device and FIG. 4 which shows a sectional view of the second embodiment in operation, the damper device includes a damper casing 12 with a plurality of damper openings 11 and 11' provided in the bottom surface thereof, an opening/closing member 13 which is a type of plate supported by a plurality of guide rails 19a provided along a predetermined portion of both sides of the damper casing 12 for opening/closing the plurality of damper openings 11 and 11', and a plurality of stoppers 18 and 18' respectively provided at a predetermined position between each of the damper openings 11 and 11' and electromagnets 14 and 14' for stopping the transverse movement of the opening/closing member 13. The stoppers 18 and 18' are provided respectively on the inner walls of the damper casing 12.

On both sides of the opening/closing member 13, similar to the first embodiment, a plurality of rollers 17 are provided. The rollers 17 are connected with the opening/closing member 13 and facilitate slidable movement along the guide rails 19a.

Unlike with the first embodiment, permanent magnets 16 and 16' are respectively attached to opposing ends of the opening/closing member 13. Electromagnets 14 and 14' are respectively fixedly provided on the inner wall at opposing ends of the damper casing 12 with the coils 15 and 15' respectively wound about the electromagnets 14 and 14'. The positions of the corresponding electromagnets 14 and 14' and the permanent magnets 16 and 16' can be interchanged. The electromagnets 14 and 14' may have either a N pole or a S pole upon applying the current flow to the coils 15 and 15'. But, the permanent magnets 16 and 16' are designed to have only one pole either a N pole or S pole.

The damper device of the second embodiment operates to open/close the damper openings 11 and 11' using a process similar to the first embodiment.

As shown in FIG. 3 and FIG. 4B, both damper openings 11 and 11' are opened by positioning the opening/closing member 13 at an intermediate position in of the damper casing 12 enabling both damper openings 11 and 11' to discharge the cooled air.

In opening only the right hand damper opening 11' as shown in FIG. 4A, when the right hand permanent magnet 16' of the opening/closing member 13 has a N pole and the right hand electromagnet 14' has a N pole, the voltage is increased to the coil 15' to be comparatively larger than that to the left hand coil 15 so that the repelling force between the electromagnet 14' and the permanent magnet 16' pushes the opening/closing member toward the coil 15. In addition, if the electromagnet 14 and the permanent magnet 16 have opposing poles, a drawing force occurs therebetween, and the opening/closing member 13 moves toward coil 15 as shown in FIG. 4A, thereby closing the damper opening 11, whereby only damper opening 11' discharges the cooled air.

In addition, when discharging cooled air through both damper openings 11 and 11', a magnetic force is created by voltage applied to the electromagnet 14' and the electromagnet 14 to position the opening/closing member substantially equidistant from each electromagnet. In this state, a predetermined repelling force exists between the electromagnet 14' and the permanent magnet 16', and a substantially equal repelling force exists between the electromagnet 14 and the permanent magnet 16, thereby moving the opening/closing member 13 to an intermediate portion thereof as shown in FIG. 4B.

For opening only the left hand damper opening 11, for example, if the permanent magnet 16 of the electromagnet 14 has a N pole, the electromagnet 14 is caused to have a N pole by applying voltage to the coil 15 which is comparatively larger than that applied to the coil 15. This creates a repelling force between the electromagnet 14 and the permanent magnet 16. In addition, the electromagnet 14' is caused to have an opposite pole to the permanent magnet 16'. As shown in FIG. 4C there will also be a drawing force therebetween, causing the opening/closing member 13 to move in a direction for closing the damper opening 11', whereby only damper opening 11 discharges the cooled air.

As mentioned above, the damper device of the second embodiment according of the present invention is capable of properly controlling the moving distance of the opening/closing member 13 by regulating of the voltage which is applied to the coils 15 and 15' of the electromagnets 14 and 14'. This enables the operator to control the amount of cooled air which is discharged from the damper openings 11 and 11'.

The opening/closing member 13 moves smoothly within the casing by use of a plurality of rollers 13 which are coupled to opposing sides of the casing. The opening/closing member 13 has a range of movement restricted by a plurality of stoppers 18 and 18' which are inwardly provided at both inner walls of the damper casing 12 between the both damper openings 11 and 11' and the electromagnets 14 and 14' for preventing contact between the electromagnets 14 and 14' and the permanent magnets 16 and 16'.

FIG. 5 is a front view showing a third embodiment of the damper device according to the present invention and FIGS. 6A to 6C are sectional views showing the operation of the damper device of the third embodiment according to the present invention.

As shown there the damper device of the third embodiment has a damper casing 22 with a damper opening 21 which is provided at an intermediate portion of a sidewall thereof and an opening/closing member 23, of a plate type, provided to one side of the damper opening 21 and in the damper casing 22 for opening/closing the damper opening 21.

A sealing member 34 which is made of rubber or foaming polystyrol is attached by an adhesive to an inner surface of the opening/closing member 23. The exterior face of the sealing member 34 being larger than the dimensions of the damper opening 21 for sealing the damper opening 21. The electromagnet casing 24 is provided at a bottom portion of the damper casing 22. The electromagnet 25 of the electromagnet casing 24 is also provided. A coil 26 is wound around a electromagnet 25.

A permanent magnet 28 is provided inside the electromagnet casing 24 and fixed by a plurality of pins 27 and 27' to an inner surface of the opening/closing member 23. One side of each of the pins 27 and 27' is connected to the opening/closing member 23 while the other side is connected to the permanent magnet 28. In addition, the permanent magnet 28 is coupled to a plurality of rollers 39 positioned at both its lower and upper sides. At the upper and lower sides of the electromagnet casing 24, there is provided a plurality of guide rails 29' for guiding movement of the opening/closing member 23 as suspended on the plurality of rollers 39. The permanent magnet 28 in the electromagnet casing 24 has a limited range of movement as shown in FIGS. 6A to 6C, as defined by a plurality of stoppers 30 and 30' provided at a predetermined upper/lower position on the inner side of the electromagnet casing 24. Movement of the opening/closing member 23 is restricted by the fixing supporter 29 provided at an inner side of the damper casing 22. And stopper 29a is provided at one end of the fixing supporter 29.

Similar to the above mentioned embodiments, the permanent magnet 28 has one pole being either a N pole or a S pole, and the electromagnet 25 has one pole between a N pole and a S pole that changes depending on the direction of the current flow applied to the coil 26.

A damper device of the third embodiment is different with the first and the second embodiments in that the opening/closing member 23 forwardly and backwardly moves with respect to the damper casing 22 in controlling air flow. However, the other operations are basically the same as the first and the second embodiments.

The backward movement of the opening/closing member is restricted by the stopper 29a of the fixing supporter 29 which is fixed at the damper casing 22. The forward movement thereof is restricted by the stoppers 30 and 30' which are respectively provided on the upper/lower walls of the electromagnet casing 24 and near the electromagnet 25.

FIG. 7 shows a front view and FIGS. 8A to 8C showing sectional views of a damper device of a fourth embodiment according to the present invention. The damper device is similar to that of the third embodiment except for a controlling means. The controlling means includes a displacement sensor 31 provided at one side of the opening/closing member 23, a transformer 32 connected to the coil 26 of the electromagnet 25 which is provided to one side of the electromagnet casing 24, and a microcomputer 33 connected electrically with the displacement sensor 31 and the transformer 32, for varying the voltage applied to the electromagnet 24.

A sealing member 34 such as rubber or foaming polystyrol having predetermined elastic properties is attached to the opening/closing member 23 for sealing the damper opening 31.

The permanent magnet 28 of the damper device according to the fourth embodiment has a plurality of rollers 39'. In comparison to the third embodiment, the fourth embodiment varies the number of rollers for more precise operation of the damper device. It is possible to stabilize movement of the opening/closing member 23 by increasing the number of rollers 39' using smaller diameter rollers.

The reference numeral 35 denotes a cable between the transformer 32 and coil 26, 36 denotes a signal input/output cable, and 37 a cable for displacement sensor feed back. The remaining reference numerals are the same as those of the third embodiment.

Operation of the damper device of the fourth embodiment according to the present invention is described herein.

First, the displacement sensor 31 provided at a predetermined position on the opening/closing member 23 detects the current location thereof and transfers this information to the microcomputer 33 through the displacement sensor feedback cable 37.

After that, the microcomputer 33 sends a signal to the transformer 32 through the signal input/output cable 36 and the transformer 32 applies a voltage based on that signal to the electromagnet 25.

To enlarge the displacement of the opening/closing member 23 as shown in FIG. 8C, voltage is applied to the electromagnet 25 for causing it to have the same polarity as the permanent magnet 28, thereby creating a repelling force between the electromagnet 25 and the permanent magnet 28. Thus, since the electromagnet 25 moves in response to the repelling force, the opening/closing member 23 correspondingly moves from the damper opening 31. To decrease the displacement as shown in FIG. 8A, voltage is applied to the electromagnet 25 for causing it to have a different polarity from that of the permanent magnet 28, thereby producing a drawing force between the electromagnet 25 and the permanent magnet 28. By these drawing forces, the electromagnet 25 is pulled, so that the opening/closing member 23 moves toward the damper opening 31.

After the operation mentioned above, the displacement of the opening/closing 23 is determined. The displacement sensor 31 detects the displacement and sends its position the microcomputer 33. Once in the desired position, the microcomputer 33 sends a stop signal to the transformer 32 for stopping movement of the opening/closing member 23.

With above-mentioned operation, the movement of the opening/closing member 23 is precisely controlled so that the amount of cooled air discharged through the damper opening 31 of the damper casing 22 can be accurately controlled.

As described above, the damper device according to the present invention is made for moving a opening/closing member for opening/closing the damper opening by the repelling or/and drawing forces of an electromagnet and permanent magnet, thereby decreasing the manufacturing cost and enhancing the productivity of the damper device. In addition, the damper device is capable of controlling precisely the amount of the cooled air which is discharged to the damper opening by exactly controlling the opening/closing member thereby enhancing the efficiency of the facilities thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A damper device, comprising:

a damper casing having a recess and a damper opening provided in said recess;

an opening/closing member slidable in said recess of the damper casing for opening/closing said damper opening;

means provided on the opening/closing member for slidably supporting the opening/closing member within said recess for slidable movement of said opening/closing member with respect to said damper opening;

a first magnet provided fixedly at an end of the opening/closing member second magnet provided fixedly within the recess of the damper casing at a position remote from said first magnet and said damper opening;

means for selectively causing said first and second magnets to attract such that the opening/closing member slidable moves within said recess from a home position for opening the damper opening; and means for elastically supporting the opening/closing member, provided fixedly between an end of the recess opposite from the end of the recess at which the second magnet is fixedly provided and the opposing/closing member for returning the opening/closing member to the home position.

2. The device of claim 1, wherein said means for slidably supporting includes a plurality of rollers disposed between the opening\closing member and the damper casing.

3. The device of claim 1, wherein said means for elastically supporting is a tensile spring.

4. The device of claim 1, wherein said first magnet is a permanent magnet and said second magnet is an electromagnet.

5. The device of claim 1, wherein said first magnet is an electromagnet and said second magnet is a permanent magnet.

6. The device of claim 1, wherein said means for elastically supporting is a compression spring.

7. The device of claim 1, wherein said electromagnet is provided for alternative installations with said permanent magnet.

8. A damper device, comprising:

a damper casing having a recess and at least one damper opening;

an opening/closing member slidable in said recess of the damper casing for opening/closing said at least one damper opening, said opening/closing member having a first and a second end;

means, provided on the opening/closing member for slidably supporting the opening/closing member with said recess for slidable movement of the opening/closing member with respect to said at least one damper opening;

a plurality of first magnets, one of said first magnets provided fixedly at each of the first and second ends of the opening/closing member; and a plurality of second magnets, one of said second magnets provided fixedly within the recess at a first position adjacent to said first end of the opening\closing member and a second position adjacent to the second end of the opening\closing member; and means for selectively causing said first and second magnets to attract such that the opening\closing member moves within said recess for opening the said at least one damper opening.

9. The device of claim 8, further comprising a plurality of stoppers, provided within the recess of the damper casing for stopping movement of the opening/closing member within the recess.

10. The device of claim 8, wherein said guiding means for slidably supporting includes a plurality of rollers disposed between the opening\closing member and the damper casing.

11. A damper device, comprising:

a damper casing having a damper opening between a first and a second surface;

an opening/closing member with a face positioned substantially parallel to a plane defined by the first surface of said damper casing for opening/closing said damper opening;

means for supporting said opening/closing member for movement of the opening/closing member in a direction substantially perpendicular to a plane defined by the first surface of the damper casing;

a first magnet fixedly provided at an end of the supporting means and adjacent to said damper casing;

a second magnet provided at an end of the opening/closing member proximate to said first magnet; and means for selectively causing said first and second magnets to attract for moving the open/closing member toward the first surface of said damper casing and to repel for moving the open/closing member away from the first surface of said damper opening.

12. The device of claim 11, wherein said opening/closing member includes a sealing member for engaging the first surface of the damper casing to cover the damper opening.

13. The device of claim 11, wherein said supporting means includes a stopper provided at an end thereof for restricting movement of the damper casing within the supporting means.

14. The device of claim 11, wherein said supporting means includes a pair of rollers for movably supporting the first magnet.

15. The device of claim 11, said wherein means for selectively causing said first and second magnets to attract further comprising, a magnet control means comprising:

a displacement sensor provided at one side of the opening/closing member for sensing the displacement of the opening/closing member with respect to the damper casing;

a transformer connected to the second magnet; and a microcomputer connected electrically with said displacement sensor and said transformer for varying a voltage of the second magnet to change the polarity of the second magnet so that the second magnet selectively attracts and repels the first magnet.

16. A damper device as recited in claim 11, wherein said first magnet is an electromagnet.

17. A damper device as recited in claim 11, wherein said second magnet is a permanent magnet.

18. A damper device as recited in claim 11, wherein said first magnet is an electromagnet and said second magnet is a permanent magnet.

* * * * *